June 6, 1939.  E. V. FRANCIS  2,161,342
VIBRATORY FEEDER
Filed July 28, 1938  3 Sheets-Sheet 2
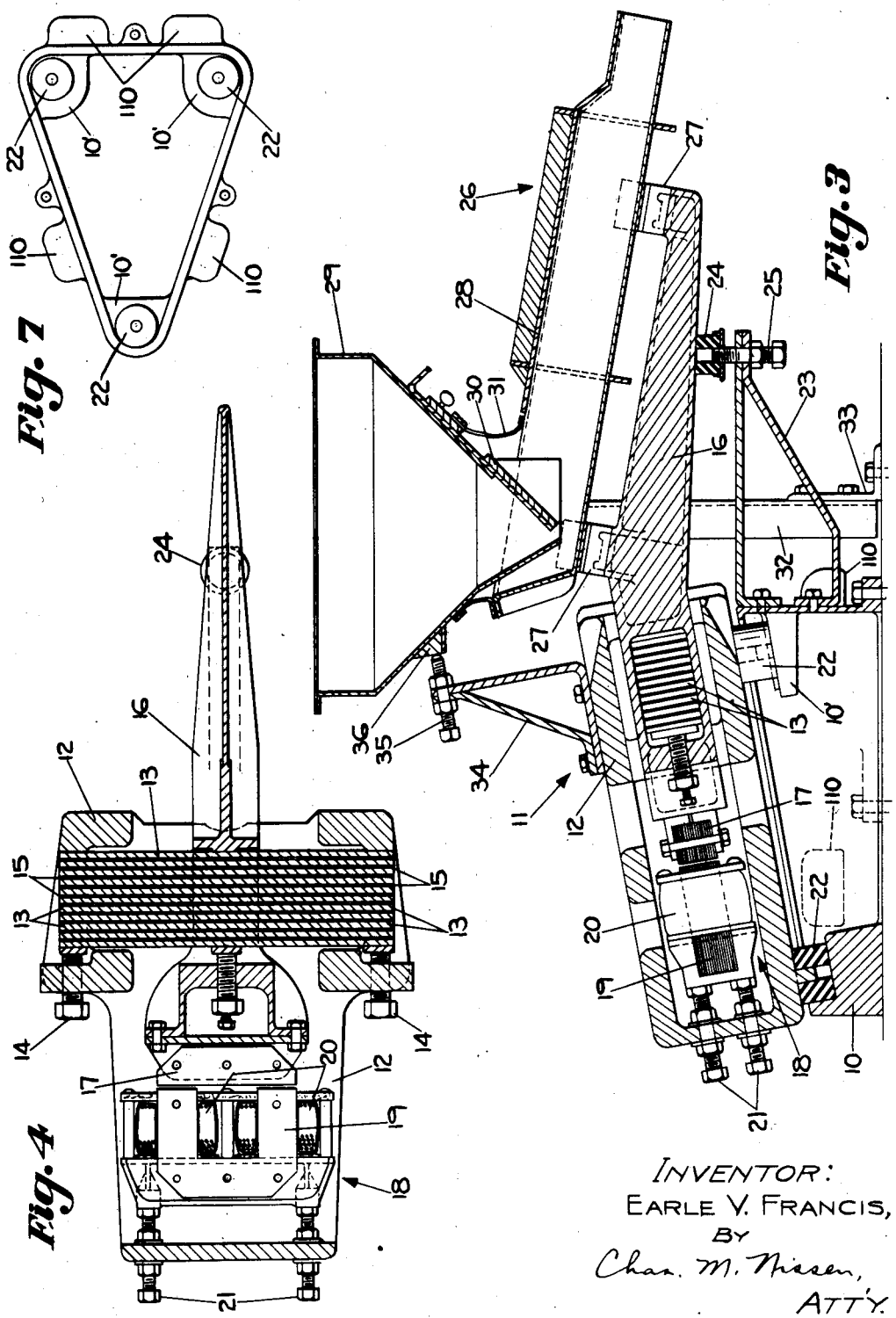
INVENTOR:
EARLE V. FRANCIS,
BY
Chas. M. Niesen,
ATT'Y.

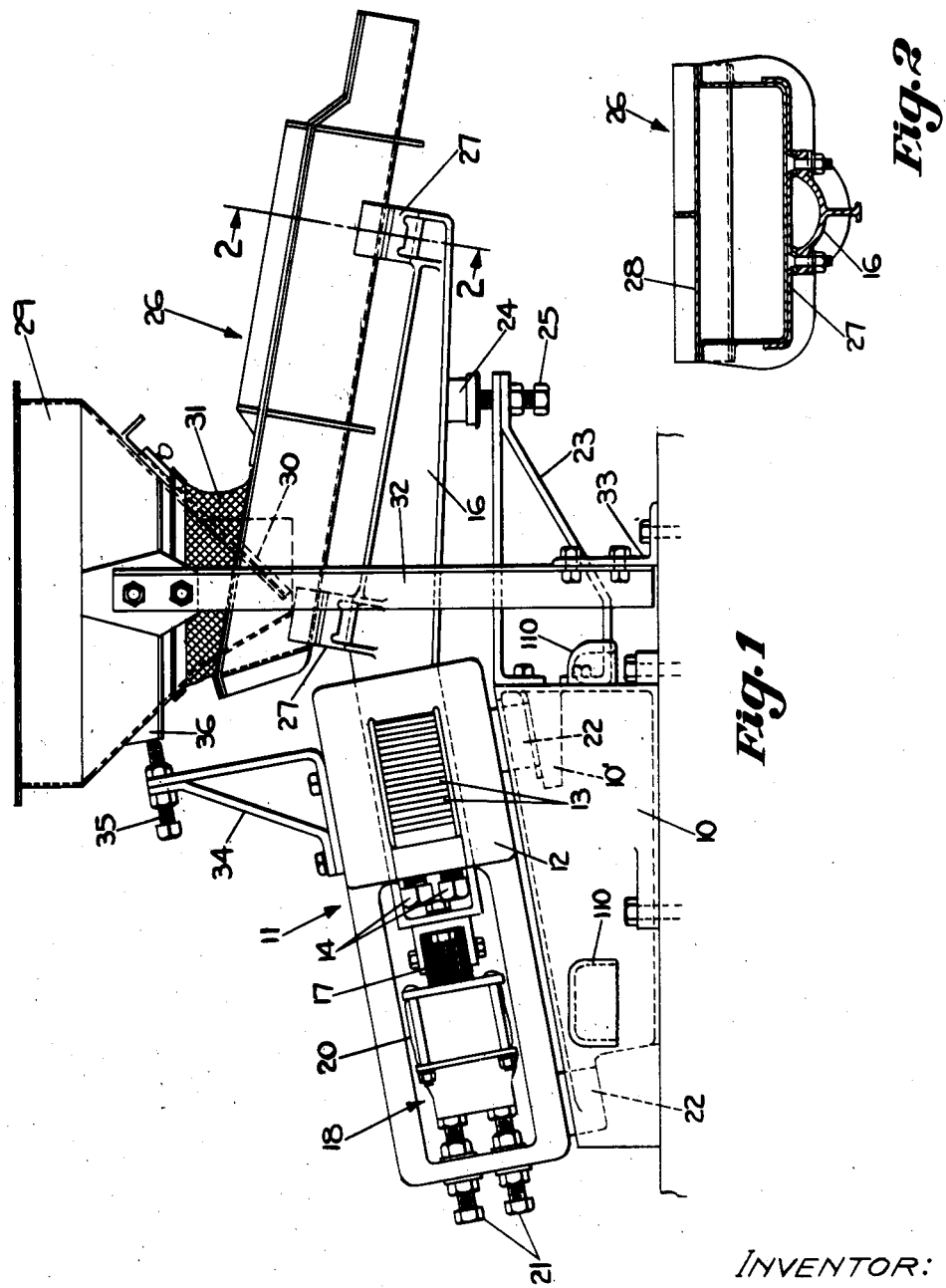

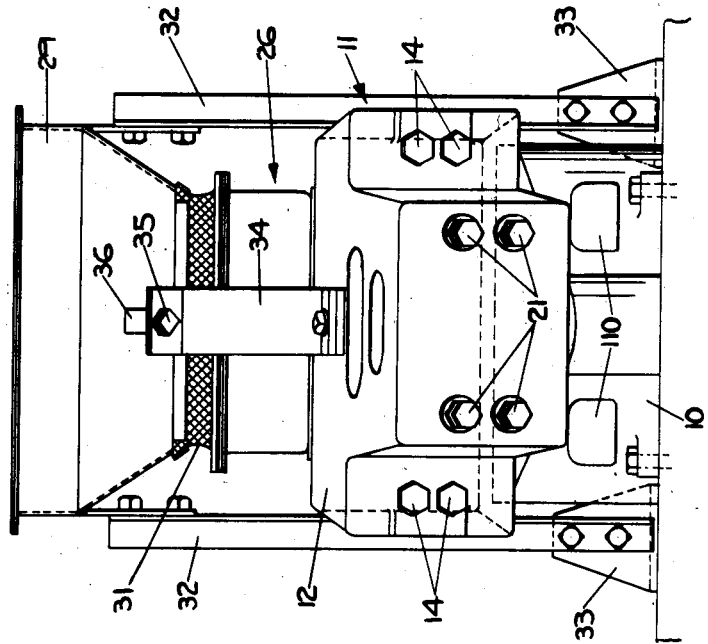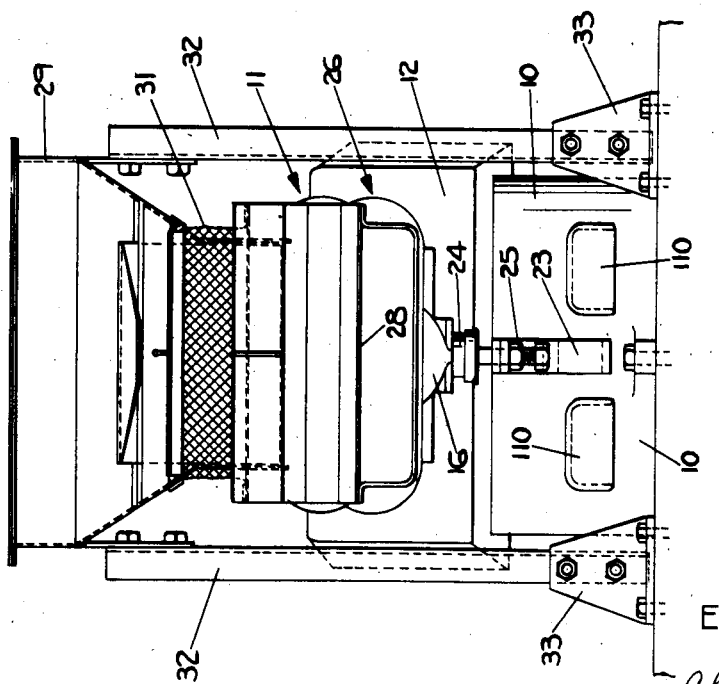

Patented June 6, 1939

2,161,342

UNITED STATES PATENT OFFICE 2,161,342

VIBRATORY FEEDER

Earle V. Francis, Columbus, Ohio, assignor to The Traylor Vibrator Company, a corporation of Colorado Application July 28, 1938, Serial No. 221,868

13 Claims. (Cl. 221—120)

This invention relates to a vibratory electromagnetic feeder and the principal object of the invention is to provide an improved feeder of this type with mechanism to insure a proper supply of material, such as granular material, at all times by imparting knocking vibrations to a hopper derived from the main frame of the feeder in which the frequency of vibration of the hopper need not be the same as the frequency of vibration of the main frame.

Other objects of the invention will appear hereinafter, the novel features and combinations being set forth in the appended claims.

In the accompanying drawings,

Fig. 1 is a side elevational view of the feeder comprising my invention;

Fig. 2 is a transverse sectional view taken on the line 2—2 of Fig. 1 looking in the direction of the arrows;

Fig. 3 is a longitudinal sectional elevational view of the device of Fig. 1;

Fig. 4 is a sectional plan view of the feeder;

Fig. 5 is a front elevational view of the feeder;

Fig. 6 is a rear elevational view of the feeder; and

Fig. 7 is a plan view of the feeder base.

In order to insure that a feeder will feed granular material properly at all times it has been found essential to improve vibration to the feed hopper or otherwise prevent arching or packing of material within the hopper. It has also been found that in many instances this arching or packing will best be prevented by knocking the hopper or causing it to vibrate at a frequency which is not the same as, and generally less than, the frequency of vibration of the deck and main frame of the feeder. The apparatus comprising my invention takes advantage of the inherent vibration in the main frame of the feeder and employs this otherwise useless energy to vibrate the hopper by a knocking action. The hopper then, under the influence of this knocking action, can vibrate at its own natural period of vibration which may be entirely different from the period of vibration of the main frame and generally will be considerably lower.

Referring particularly to the accompanying drawings, it will be seen that the complete feeder is formed by a triangular base or stand 10, which may be in the form of a hollow casting, upon which is mounted an electro-magnetic feeder 11 comprising a motor including a main frame or casting 12 adapted to receive a plurality of spring leaves or vibrator bars 13, the ends of which are clamped rigidly in said casting 12 by set screws 14 and spaced apart by spacers 15.

To the centers of the vibrator bars 13 there is clamped an armature shaft 16 to which is connected an armature 17 preferably made of laminated steel. The casting 12 also carries a field structure 18 which includes a U-shaped core 19 of laminated steel and a pair of energizing coils 20. Adjusting screws 21, 21 are provided to adjust the position of the field structure 18 with respect to the armature 17 to insure that there will be no actual contact between them when said coils 20 are energized either by alternating or "mixed current" in a manner described in full detail in Patent No. 2,094,785 for a vibratory conveyor issued to James A. Flint on October 5, 1937.

The casting or main frame 12 is supported from the base or stand 10 by a plurality of rubber cushions 22 which rest on corner ledges 10' thereof and are held against lateral movement thereby and which allow free vibration of said main frame 12 without imparting any vibration to said stand 10. To supplement the support of the vibratory feeder, the stand 10 carries a forwardly extending bracket 23 which, at its forward end, carries a rubber cushion 24 carried on adjustable bolt 25. The cushion 24 is particularly useful in supporting the armature shaft 16 and the elements carried thereby to prevent a twisting strain being placed upon the vibrator bars 13. Stand 10 is also provided with lifting handles 110.

Mounted upon and rigidly attached to the armature shaft 16 is a trough or deck 26 which is rigidly attached to said armature shaft 16 by spaced bracket means 27, 27. As illustrated in the drawings the deck 26 is provided with a cover plate 28, but if desired an open type deck may be employed and formed by omitting said cover plate 28.

Positioned above the deck 26 and mounted entirely independently thereof and independently of the main frame 12 so that the vibrations of neither are transmitted directly thereto, is a feed hopper 29 the bottom of which extends into said trough or deck 26 and is provided with an adjustable gate 30. A flexible connection 31 made of canvas or rubber is provided to form a completely enclosing connection between the hopper 29 and the deck 26 while permitting them to vibrate entirely independently of each other.

The hopper 29 is supported by a pair of spaced uprights 32 which are supported from a superstructure or foundation by brackets 33. The uprights 32, while being generally rigid, will not be entirely so and will permit vibration of the hopper 29 and, in fact, will make, with said hopper 29, a vibratory system which, preferably, has a relatively low natural period of vibration and one which is considerably below the operating frequency of the electro-magnetic vibratory motor formed by the field structure 18, armature 17 and vibrating bars 13.

While in the design of apparatus of this type the parts are so proportioned that the main frame 12 will have a relatively small amount of vibration as compared to the vibration of the armature shaft 16 and the deck 26, it is inherent that said main frame 12 will have some vibration. It is, of course, evident that the frequency of this vibration is the same as the frequency of vibration of the deck 26. I propose to utilize the vibration in the main frame 12 to vibrate the hopper 29 to prevent arching or packing of material therein, thereby to insure a proper feeding of material to the pan 26 at all times. It has been found, however, that if a direct connection is made between the hopper 29 and the main frame 12 the frequency of vibration of the hopper may not be the most efficient for many materials because it will, of necessity, be the same as that of the frequency of vibration of the main frame 12 which, it may be stated, will either be equal to or twice the frequency of the source of alternating current, depending upon whether straight alternating current or mixed current is employed, as set forth in the above mentioned patent to James A. Flint.

Furthermore, it has been found that for many materials a knocking action on the hopper 29 is preferred to a positive vibratory action. This apparently is true because the hopper and the uprights 32 which support it provide a system having a natural period of vibration which is relatively low and one in which a higher amplitude of vibration will tend to be produced than is present in the main frame 12. I therefore provide a knocker in the form of a bracket 34 which is rigidly attached to the main frame 12 and which is provided with an adjustable screw 35 providing a knocker head. This screw or knocker head 35 is adapted to knock an anvil 36 formed rigidly with the hopper 29.

In the operation of the device comprising my invention alternating or mixed current will be supplied to the motor of the feeder 11 and will cause vibration of the deck 26 to convey any material therealong and will also inherently produce some vibration thereof of lesser amplitude in the main frame 12.

Due to the fact that the plane of the bars 13 makes an acute angle with the plane of the bottom of the deck 26 a positive conveying action will be imparted to any granular material carried by said deck 26 and this conveying section will convey material from the left to the right, as viewed in Figs. 1 and 3 of the drawings.

While the deck 26 is shown sloping downwardly this structure is not essential because the feeder will convey granular material even though the deck 26 has its bottom substantially horizontal or even sloping upwardly toward the discharge end provided the upward slope is not too great. It is, of course, obvious, however, that the capacity of the feeder is increased if sloped downwardly, as illustrated in the drawings.

Material in the hopper 29 will flow out of the bottom thereof under the general control of the gate 30 and be fed and discharged by said deck 26. The vibrations inherently present in the main frame 12 will cause the knocker head 35 to pound upon the anvil 36 and to jar and vibrate said hopper 29 to prevent arching and packing of material therein. As was above set forth, this hammer action will produce a larger amplitude of vibration in the hopper 29 than the amplitude of vibration of the main frame 12 due to the entirely independent supporting of said hopper 29 and the fact that said hopper 29 and the uprights 32 provide a vibratory system having a relatively low natural period of vibration at which said hopper 29 will vibrate when once set into vibratory motion by non-positive exciting means.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a vibratory feeder, the combination with a main frame, of a deck, means for supporting said deck for vibration, electro-magnetic motor means for vibrating said deck and main frame, a hopper positioned to deliver material to said deck by which it is fed when vibrated, means for supporting said hopper independently of both said deck and main frame, and a knocker attached to said main frame to vibrate therewith and positioned to knock said hopper, whereby the vibrations in said main frame may be employed to vibrate said hopper at a frequency which need not be the same as that of the vibrations of said main frame.

2. In a vibratory feeder, the combination with a main frame, of a deck, means for vibrating said deck and main frame, a hopper positioned to feed material to said deck, and a knocker carried by said main frame and adapted to impart vibration to said hopper as derived from said main frame.

3. In a vibratory feeder, the combination with a conveyor deck, a support, spring means mounting said deck for vibratory movement relative to said support, means connected to said support and deck to vibrate them, a hopper positioned to feed material to said deck, and knocker means attached to said support and having an impositive knocking contact with said hopper to vibrate it by energy derived from said support.

4. In a vibratory feeder, the combination with a main frame, of a deck, means for vibrating said deck and main frame, a hopper positioned to feed material to said deck, a knocker carried by said main frame and adapted to impart vibration to said hopper as derived from said main frame, and means supporting said hopper which provides therewith a system having a relatively low natural period of vibration compared to the frequency of vibration of said deck.

5. In a vibratory feeder, the combination with a conveyor deck, a support, spring means mounting said deck for vibratory movement relative to said support, means connected to said support and deck to vibrate them, a hopper positioned to feed material to said deck, knocker means attached to said support and having an impositive knocking contact with said hopper to vibrate it by energy derived from said support, and means supporting said hopper which provides therewith a system having a relatively low natural period of vibration compared to the frequency of vibration of said deck.

6. In a vibratory feeder, the combination with a main frame, of a deck, means for supporting said deck for vibration, electro-magnetic motor means for vibrating said deck and main frame, a hopper positioned to deliver material to said deck by which it is fed when vibrated, means for supporting said hopper independently of both said deck and main frame, a knocker attached to said main frame to vibrate therewith and positioned to knock said hopper, whereby the vibrations in said main frame may be employed to vibrate said hopper at a frequency which need not be the same as that of the vibrations of said main frame, and said means supporting said hopper providing therewith a system having a relatively low natural period of vibration compared to the frequency of vibration of said deck.

7. In a vibratory feeder, the combination with a base frame, of a main frame mounted thereon for vibratory movement relatively thereto, a conveyor mounted on said main frame for vibratory movement relatively thereto, means for vibrating said conveyor to operate the same while vibrating said main frame relatively to said base, a hopper mounted for vibration independently of the vibration of the conveyor but in position to feed material thereto, and knocking means mounted on said main frame in association with said hopper to effect vibrations of the latter to facilitate the feeding of the material to the conveyor.

8. In a vibratory feeder, the combination with a main frame, of means for resiliently supporting said main frame for vibration, a vibratory conveyor, means for operating said conveyor by vibrating the same relatively to said main frame while vibrating the main frame on its resilient supporting means, additional resilient means for assisting in supporting the weight of the conveyor, a hopper in position to deliver material to said conveyor, and knocking means mounted on said main frame in association with said hopper to cause vibration of the main frame to impart a knocking action on said hopper to facilitate delivery of material from the latter to said conveyor.

9. The combination with a vibratory conveyor unit, of a base frame, means mounting said vibratory conveyor unit on said base frame for vibration as a whole relatively thereto, a hopper for feeding material to said vibratory conveyor, mechanism for mounting said hopper for vibration independently of the vibration of said vibratory conveyor, and knocking mechanism mounted on said vibratory conveyor unit in association with said hopper to effect knocking of the latter at intervals to effect the aforesaid vibration thereof during operation of the vibratory unit and during feeding of the material thereto from said hopper.

10. In a vibratory feeder, the combination with a vibratory conveyor unit, of a hopper, upright standards on opposite sides of said conveyor unit for supporting said hopper in position to deliver material to said vibratory conveyor unit, and knocking mechanism mounted on said vibratory conveyor unit in association with said hopper to tap the latter at intervals during operation of said vibratory conveyor unit and during the feeding of material thereto from said hopper.

11. In a vibratory feeder, the combination with a vibratory feeder comprising a conveyor trough, of a hopper, mechanism mounting said hopper for vibration independently of the vibration of said conveyor trough, a flexible enclosure connecting said hopper to said conveyor trough to prevent spilling of material during the flow thereof from said hopper into said conveyor trough, and knocking mechanism mounted on said vibratory conveyor unit in association with said hopper to effect tapping thereof at intervals to cause the aforesaid independent vibration thereof during operation of the vibratory conveyor unit and during feeding of material from said hopper to said conveyor trough.

12. In a vibratory feeder, the combination with a vibratory conveyor unit, of a hopper mounted in position to deliver material thereto, a bracket mounted on a part of said vibratory conveyor unit to vibrate with such part, a tapper, an abutment block mounted on one side of said hopper, and means for mounting said tapper on said bracket for adjustment relative thereto and in position to engage at intervals said abutment block to effect vibration of said hopper during operation of said vibratory conveyor unit and the feeding of material thereto from said hopper.

13. In a vibratory feeder, the combination with a base frame, of a main frame mounted thereon for vibration relatively thereto in an upwardly inclined position, a supplemental frame, a conveyor deck mounted on said supplemental frame in inclined position to slant downwardly from the upper end of said main frame to the discharge end of said deck, vibrating resilient bars anchored at their ends to said main frame to vibrate at their middle in the direction of upward slant of said main frame, mechanism connecting the rear end of said supplemental frame to the middle portion of said vibrating bars, a magnetic armature secured to the rear end of said supplemental frame adjacent the middle portion of said vibrating bars, an electro-magnet on said main frame in position to act on said armature to effect vibration of said bars and said supplemental frame, a hopper mounted for vibration independently of the vibration of said deck but in position to deliver material thereto, and knocking mechanism mounted on said main frame to partake of the vibrations thereof relatively to said base frame and in position to tap at intervals said hopper during the action of said electro-magnet on said armature.

EARLE V. FRANCIS.